Patented Aug. 31, 1948

2,448,434

UNITED STATES PATENT OFFICE 2,448,434

PROCESS FOR PRODUCING NONBREAK OIL

Jakob L. Jakobsen, Minneapolis, Minn., assignor to General Mills, Inc., a corporation of Delaware No Drawing. Application October 5, 1946, Serial No. 701,409

9 Claims. (Cl. 260—424)

The present invention relates to a process of producing non-break oil and to the resultant products.

Naturally-occurring oils, particularly vegetable oils, contain constituents, principally phosphatides, which become insoluble upon heating and produce a turbid appearance in oil which is subjected to an elevated temperature. When phosphatides and other materials precipitate from an oil at elevated temperatures, the oil is said to "break." This property of the untreated oil renders it inapplicable for certain uses, particularly in the protective coating field.

Various processes have been developed for making non-break oils. One of these methods involves the treatment of the oil with water or various electrolytes such as mild acid or alkaline solutions to precipitate a large part of the phosphatides which may then be removed. Such processes may result in what is known as a heat non-break oil; that is, an oil which does not cause precipitation of insoluble material by the application of heat alone. Such oils however, may not be non-break according to the Gardner break test. Physical and Chemical Examination of Paints, Varnishes, Lacquers and Colors—Gardner, 9th ed., page 295. This test is generally accepted as an accurate determination of the presence or absence of break constituents. Heat non-break oils may contain small quantities of break constituents which interfere with the varnish making process, for example, and thus render the oil of less value for protective coating purposes. When, however, an oil has been made Gardner non-break, it may be used in protective coatings without fear of interference from any break constituents. It is known that a heat non-break oil may be made Gardner non-break by treating it with activated earths or by alkali refining. However, such treatments involve appreciable losses, thus increasing the cost of the treated oil.

It has now been found that it is possible to produce a Gardner non-break oil without undue loss in processing. This process involves the use of certain halogenated low aliphatic acids as degumming agents.

It is, therefore, an object of the present invention to provide a novel process of producing a non-break oil without undue loss.

It has been found that by treating a crude oil containing break constituents with a halogenated low aliphatic acid that it is possible to produce a Gardner non-break oil. This treatment may be accomplished in any of a number of ways. For example, the halogenated acid may be added directly to the oil in a suitable proportion, for example, a small fraction of 1%, to 2% or more, based on the weight of the oil. The halogenated acid is soluble or dispersible in the oil and produces a homogeneous mixture or solution. Water may then be added to this mixture which reduces the miscibility of the halogenated acid with the oil, and the mixture separates into two phases, an upper phase containing the non-break oil, and a lower phase containing an aqueous solution of the halogenated acid. It is found that the phosphatides and the other break constituents are present in this aqueous acid phase. Where the aqueous acid possesses an acid concentration of about 30–40% or more, the phosphatides are soluble in these aqueous acid solutions. Where the concentration of the acid in the water is reduced appreciably below this range, it is found that the phosphatides are no longer soluble, but tend to precipitate in the aqueous phase. This, however, does not interfere with the separation of the oil from the aqueous phase. Accordingly it is possible to add the acid directly to the oil in an anhydrous condition and later effect phase separation by dilution with water. As an alternative, it is possible to start with an aqueous solution of the halogenated acid and mix it directly with the oil, in which event the mixture would not be homogeneous, but would be composed of two phases.

After the two phases are obtained, they may be separated in any conventional manner, as for example, by settling, centrifuging, and the like.

In general, it has been found that this process of producing a non-break oil may be accomplished with relatively small quantities of the halogenated acids. Thus 0.1–1.0% is found adequate in most instances, depending upon the particular oil employed and upon the particular halogenated acid. Larger quantities may be necessary in certain instances.

Various mono- and polyhalogenated acids have been found to be satisfactory. For example, mono-, di- and trichloracetic acid and mixtures of the same, alpha-chloropropionic acid, beta-chloropropionic acids, have been found satisfactory.

The above processes may be applied directly to the crude oil containing its natural component of break constituents. However, in view of the ease with which a large proportion of these constituents may be removed with water or other degumming agents alone, and in view of the reduced quantity of halogenated acid required for the further treatment of such a preliminarily treated oil, it is preferred to employ the halogenated acids on an oil which has been degummed in a conventional manner. For example, an oil may be mixed with a small quantity of water, frequently about 2%, and then heated to an elevated temperature such as 85° C. for such a period as is required to produce a break. The oil may then be allowed to settle and may be separated from the precipitated phosphatides. Thereafter the oil may be treated with the halogenated acid to produce a Gardner non-break oil.

Example 1

1150 g. of crude soybean oil were heated to 70° C. at which point 2% of water was added. The mixture was then heated to 85° C. within ten minutes and maintained at that temperature for 50 minutes with stirring. The precipitated material was allowed to settle and was removed by filtration. 400 g. of the soybean oil thus degummed was stirred with 2% of a 30% aqueous solution of trichloracetic acid for one hour within the temperature range of 35–60° C. after which the mixture was allowed to stand overnight. A yellow-colored precipitate formed as a thin layer of fine grains. The oil was separated from the precipitated material by filtration, which was accomplished readily. The resultant oil was found to be Gardner non-break.

Example 2

Crude soybean oil was mixed with 1% by weight of a 75% aqueous solution of trichloracetic acid, and the mixture was stirred for one half hour after the temperature was raised from 27° C. to 65° C. The resultant mixture was then diluted stepwise with water until the aqueous phase ultimately had a concentration of 9.4% of trichloracetic acid. During the gradual dilution, the aqueous phase changed from a clear solution to one in which the phosphatides and other material were in a precipitated form and gave the aqueous phase a silky appearance. This change was brought about by the gradual addition of the water and was accompanied by the gradual appearance of the precipitated material. The aqueous phase was finally separated from the oil to produce an oil which was Gardner non-break.

Example 3

750 g. of crude soybean oil was degummed with 2% water by mixing the water with the oil at about 30° C. and then raising the temperature to 80° C. in a period of about one half hour. Then stirring was continued for one half hour with the heat removed, during the course of which time the temperature dropped to 50° C. The precipitate was then allowed to settle and was filtered off. The oil was then stirred for 50 minutes at a temperature varying from 30–65° C., with one-tenth of one per cent trichloracetic acid in the form of a 30% aqueous solution. Evaporation during this period removed sufficient water that the phosphatides were soluble in the trichloracetic acid solution. A small quantity of water, 0.13% based on the oil, was added at two different times. A slight precipitate formed which was removed by filtration. The resulting oil obtained was found to be Gardner non-break.

Example 4

750 g. of crude soybean oil was degummed with 2% of water as previously described. The resulting oil was divided into two batches of 300 g. each, one being treated with one-half of one per cent of alpha-chloropropionic acid and the other with one-half of one per cent of beta-chloropropionic acid. The batches were stirred ten minutes at room temperature after which one-half of one per cent of water was added, and the mixtures heated to 60° C. Thereafter three-tenths of one per cent of water was added and the batches stirred while the temperature dropped to 45° C. The mixtures were allowed to settle into two phases and the oil phase was recovered. Both samples were subjected to the Gardner break test and were found to be Gardner non-break.

Example 5

2 g. of monochloracetic acid in the form of crystals was added to 400 g. of degummed soybean oil at a temperature of 50° C. The mixture was stirred for 15 minutes, after which 4 g. of water were added. The mixture was heated to 60–65° C. and was stirred for one half hour. Thereafter the mixture was allowed to settle and the supernatant oil was filtered to produce a clear oil. This clear oil was subjected to the Gardner non-break test, and was found to be non-break.

While various modifications of the present invention have been described, it is to be understood that the same is not limited thereto, but may be varied within the scope of the following claims.

I claim as my invention:

1. Process of producing a Gardner non-break oil which comprises treating a vegetable oil containing break constituents with a small proportion of a halogenated low aliphatic acid in the presence of water to produce two phases, an oil phase substantially free from break constituents, and an aqueous phase containing the halogenated acid and the break constituents, and separating the two phases.

2. Process of producing a Gardner non-break oil which comprises adding an aqueous solution of a halogenated low aliphatic acid to a vegetable oil containing break constituents and separating the aqueous phase from the oil, the quantity of halogenated low aliphatic acid being a small proportion of the oil.

3. Process of producing a Gardner non-break oil which comprises adding a small proportion of a halogenated low aliphatic acid to a vegetable oil containing break constituents to produce a solution of the halogenated acid in the oil, adding water to said solution to cause the solution to separate into two phases, an oil phase substantially free from break constituents and an aqueous solution of the halogenated acid containing the break constituents, and separating the two phases.

4. Process of producing a Gardner non-break oil which comprises degumming a vegetable oil, treating the degummed oil with a small proportion of a halogenated low aliphatic acid in the presence of water to produce two phases, an oil phase substantially free from break constituents and an aqueous phase containing the halogenated acid and the break constituents, and separating the two phases.

5. Process of producing a Gardner non-break oil which comprises degumming a vegetable oil, treating the degummed oil with a small proportion of a chlorinated low aliphatic acid in the presence of water to produce two phases, an oil phase substantially free from break constituents and an aqueous phase containing the chlorinated acid and the break constituents, and separating the two phases, 6. Process of producing a Gardner non-break oil which comprises treating a vegetable oil containing break constituents with a small proportion of a polychlorinated acetic acid in the presence of water to produce two phases, an oil phase substantially free from break constituents and an aqueous phase containing the polychlorinated acetic acid and the break constituents, and separating the two phases.

7. Process of producing a Gardner non-break oil which comprises degumming a vegetable oil containing break constituents, treating the degummed oil with a small proportion of a polychlorinated acetic acid to produce a solution of the acetic acid in the oil, adding water to the solution to produce two phases, an oil phase substantially free from break constituents and an aqueous phase containing the chlorinated acetic acid and the break constituents, and separating the two phases.

8. Process of producing a Gardner non-break oil which comprises adding water to a vegetable oil containing break constituents to precipitate part of the break constituents, removing the aqueous phase to produce a degummed oil, treating the degummed oil with a polychlorinated acetic acid in an amount of .1 to 1% based on the weight of the oil to produce a solution of the acetic acid in the oil, adding water to the solution to produce two phases, an oil phase substantially free from break constituents and an aqueous phase containing the chlorinated acetic acid and the break constituents, and separating the two phases.

9. Process of producing a Gardner non-break oil which comprises adding water to a vegetable oil containing break constituents to precipitate part of the break constituents, removing the aqueous phase to produce a degummed oil, treating the degummed oil with a monochloracetic acid in an amount of .1 to 1% based on the weight of the oil to produce a solution of the acetic acid in the oil, adding water to the solution to produce two phases, an oil phase substantially free from break constituents and an aqueous phase containing the monochloracetic acid and the break constituents, and separating the two phases.

JAKOB L. JAKOBSEN.

REFERENCES CITED

The following references are of record in the file of this patent:

UNITED STATES PATENTS

| Number | Name | Date |
|---|---|---|
| 2,113,960 | Grote et al. | Apr. 12, 1938 |
| 2,390,528 | Freeman | Dec. 11, 1945 |

OTHER REFERENCES

Ferris et al.: Industrial and Engineering Chemistry, July 1931, vol 23, No. 7, pages 753–4.

Ser. No. 322,481, Christiansen (A. P. C.), published Apr. 20, 1943.